US009345195B2

(12) United States Patent
Kokanovic et al.

(10) Patent No.: US 9,345,195 B2
(45) Date of Patent: May 24, 2016

(54) AIR BLAST SOFT FRUIT HARVESTING DEVICE

(71) Applicants: Momcilo Kokanovic, Obrenovac (RS); Miodrag Kokanovic, Obrenovac (RS); Marko Kokanovic, Obrenovac (RS)

(72) Inventors: Momcilo Kokanovic, Obrenovac (RS); Miodrag Kokanovic, Obrenovac (RS); Marko Kokanovic, Obrenovac (RS)

( * ) Notice: Subject to any disclaimer, the term of this patent is extended or adjusted under 35 U.S.C. 154(b) by 0 days.

(21) Appl. No.: 14/425,018

(22) PCT Filed: Aug. 30, 2013

(86) PCT No.: PCT/RS2013/000017
§ 371 (c)(1),
(2) Date: Feb. 28, 2015

(87) PCT Pub. No.: WO2014/035273
PCT Pub. Date: Mar. 6, 2014

(65) Prior Publication Data
US 2015/0223399 A1      Aug. 13, 2015

(30) Foreign Application Priority Data

Aug. 30, 2012   (RS) .................................. P-2012/0374

(51) Int. Cl.
*A01D 46/00*   (2006.01)
(52) U.S. Cl.
CPC ..................................... *A01D 46/005* (2013.01)
(58) Field of Classification Search
CPC ..... A01D 46/005; A01D 46/10; A01D 57/10; A01D 91/00; Y10S 56/08
USPC ................ 56/328.1, 30, DIG. 8, 32
See application file for complete search history.

(56) References Cited

U.S. PATENT DOCUMENTS

| | | | |
|---|---|---|---|
| 2,545,072 A | | 12/1948 | Denman |
| 2,670,586 A | * | 3/1954 | Phillips .................. A01D 57/10 56/1 |

(Continued)

FOREIGN PATENT DOCUMENTS

| | | | | |
|---|---|---|---|---|
| FR | 2226925 A | * | 12/1974 | ............. A01G 19/00 |
| GB | 2133664 | | 8/1984 | |

(Continued)

*Primary Examiner* — Árpád Fábián-Kovács
(74) *Attorney, Agent, or Firm* — Simana Rao, Esq.; McNeely, Hare & War LLP

(57) ABSTRACT

The invention relates to the air blast soft fruit harvesting device comprising an air flow director (1), pulsator (2), distancing channel (3), segmented extension (4) and blower fan (5) assembly. The distancing channel (3) is connected with the segmented extension (4) on the top side and with the pulsator (2) on the bottom side, whereas the pulsator (2) is simultaneously connected with the air flow director (1) on the bottom side, and the segmented extension (4) is connected with the blower fan (5). The blower fan (5) constantly sends air to the director (1), through the segmented extension (4), distancing channel (3) and pulsator (2) directing the air towards a fruit shrub, thus shaking ripe fruits. In the course of the rotation of the pulsator (2) rotor (32), the pulsator (2) alternately sends air, in a single cycle, through the channels (6, 7 and 8), and then through the channels (9, 10 and 11) of the director (1), where the air flow leaving the pulsator (2) varies, achieving its power impact. It is possible to regulate the air blast power and speed over the connecting tube (78) by discharging part of the air which the blower fan (5) sends towards the director (1), into the atmosphere. The regulation is performed manually with the lever (81). Thus, regulation of the air blow power impact on a fruit shrub is obtained. When using the device for harvesting soft fruit, two devices are used simultaneously, positioned in such way that there is a row of shrubs between them.

5 Claims, 14 Drawing Sheets

(56) References Cited

U.S. PATENT DOCUMENTS

| | | | | |
|---|---|---|---|---|
| 2,970,771 | A * | 2/1961 | Przystawik | B05B 17/08 239/17 |
| 3,006,131 | A * | 10/1961 | McDowell | A01D 46/005 56/330 |
| 3,276,194 | A * | 10/1966 | Mohn | A01D 46/005 56/330 |
| 3,347,587 | A * | 10/1967 | Frost | A01D 46/24 294/119.3 |
| 3,405,515 | A * | 10/1968 | Dittmer | A01D 46/24 294/119.3 |
| 3,410,066 | A * | 11/1968 | Boynton | A01D 46/085 56/30 |
| 3,421,301 | A * | 1/1969 | Boynton | A01D 46/08 56/30 |
| 3,473,312 | A | 10/1969 | Holt | |
| 3,664,104 | A | 5/1972 | Jamshidi | |
| 3,813,857 | A * | 6/1974 | Harrington | A01D 46/10 56/13.1 |
| 3,881,226 | A | 5/1975 | Kent | |
| 4,134,250 | A * | 1/1979 | Scheffler | A01D 46/005 56/30 |
| 4,175,368 | A * | 11/1979 | Scheffler | A01D 46/005 239/225.1 |
| 4,294,597 | A | 10/1981 | Archer | |
| 4,388,798 | A | 6/1983 | Gerber | |
| 4,558,561 | A | 12/1985 | Mendenhall | |
| 4,637,096 | A | 1/1987 | Wise | |
| 5,111,612 | A * | 5/1992 | Takishima | A01G 7/045 47/60 |
| 5,299,383 | A * | 4/1994 | Takakura | A01G 9/246 47/17 |
| 5,319,911 | A | 6/1994 | Wilhite | |
| 7,743,593 | B2 * | 6/2010 | Owen | A01D 46/10 56/30 |
| 2005/0126144 | A1 * | 6/2005 | Koselka | A01D 46/30 56/10.2 R |
| 2006/0213167 | A1 * | 9/2006 | Koselka | A01D 46/30 56/10.2 A |
| 2011/0047951 | A1 * | 3/2011 | Moore | A01D 46/24 56/234 |
| 2015/0319930 | A1 * | 11/2015 | Marrs | A01D 75/00 56/329 |

FOREIGN PATENT DOCUMENTS

| | | |
|---|---|---|
| RS | 44477 | 8/1990 |
| RS | 47246 | 1/1995 |
| RS | 47636 | 4/1995 |
| RS | 47590 | 10/1995 |
| RS | 50064 | 1/2009 |
| WO | WO96/32833 | 10/1996 |
| WO | WO00/33637 | 6/2000 |
| WO | WO00/62594 | 10/2000 |
| WO | WO2009/013722 | 1/2009 |
| YU | 65MP | 8/1997 |
| YU | 1696 | 8/1998 |
| YU | 314MP | 3/2001 |
| YU | 488MP | 11/2002 |
| YU | 47199 | 11/2004 |
| YU | 22304 | 5/2006 |
| YU | 65104 | 8/2006 |

* cited by examiner

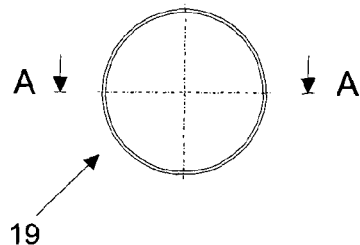
Fig. 5
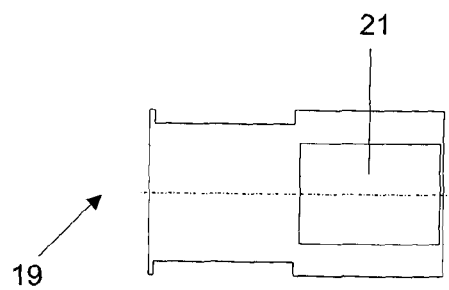
Fig. 6
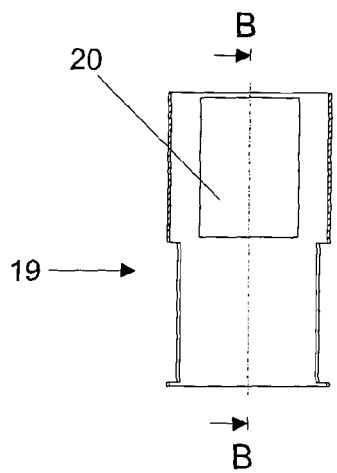
Section A-A
Fig. 7
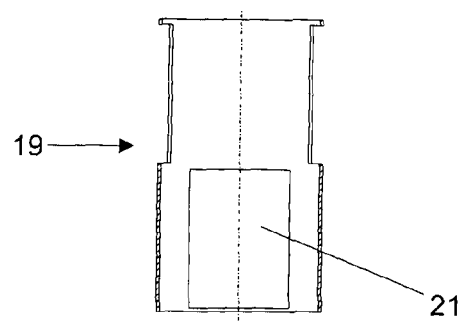
Section B-B
Fig. 8
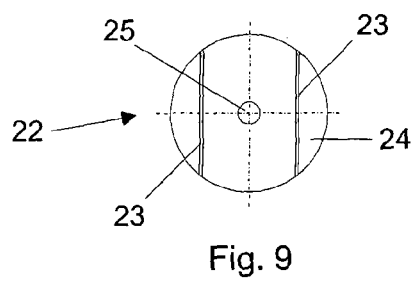
Fig. 9
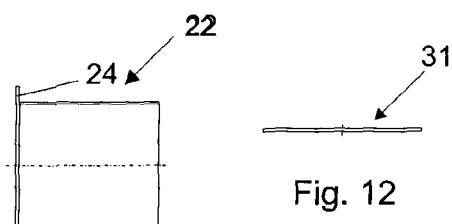
Fig. 10
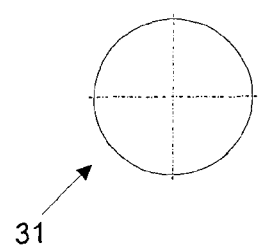
Fig. 12
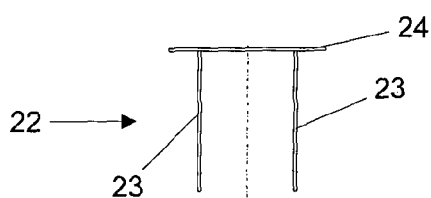
Fig. 11
Fig. 13

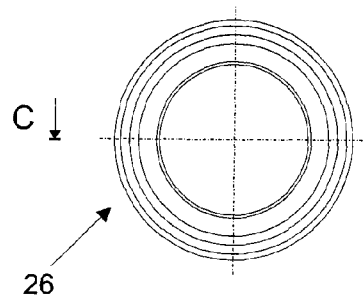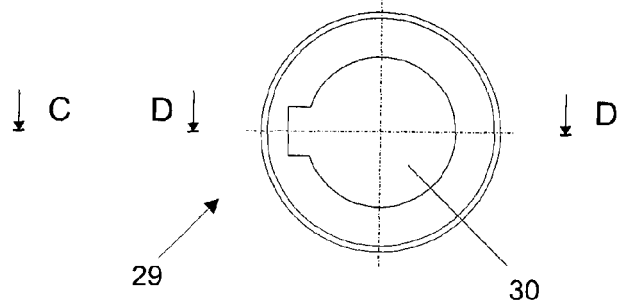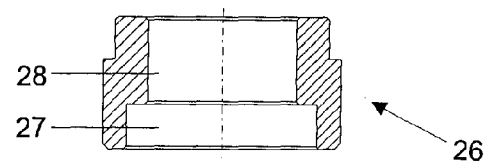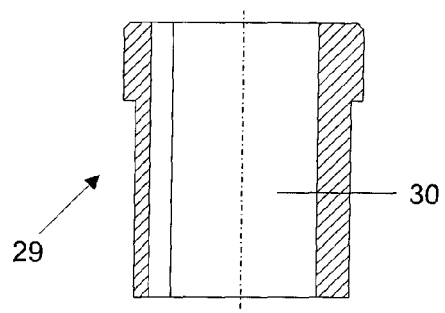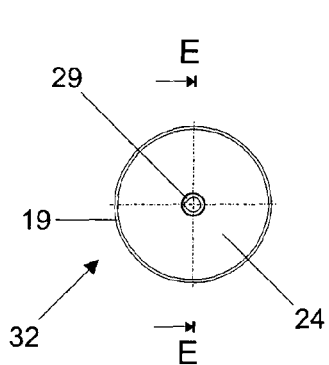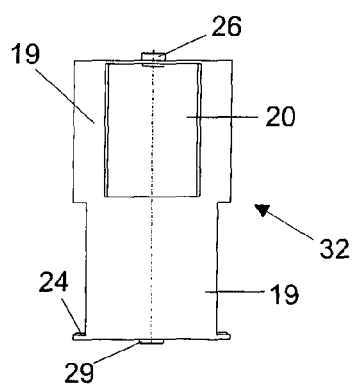

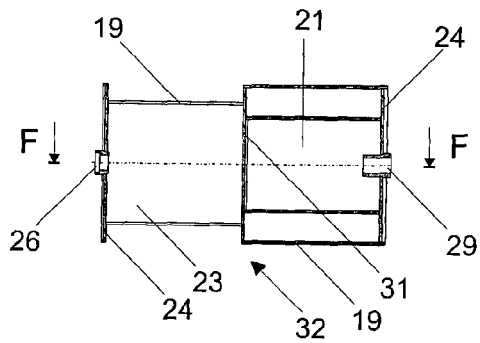
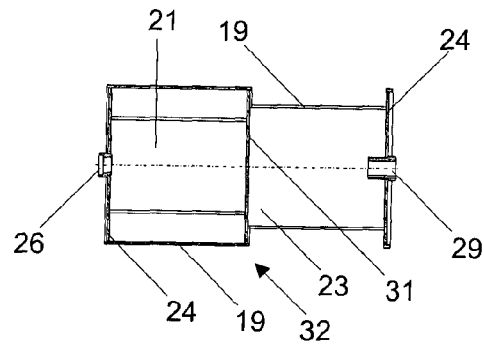
Section E-E
Fig. 20
Section F-F
Fig. 21
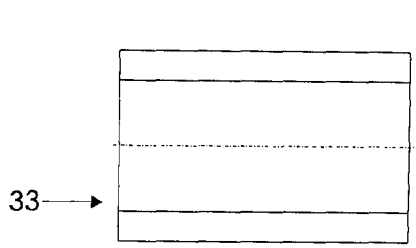
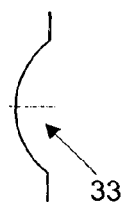
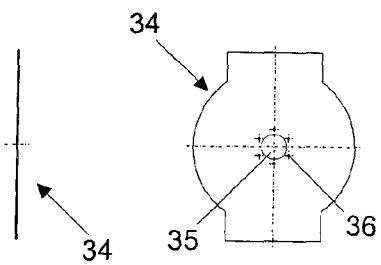
Fig. 22  Fig. 23  Fig. 24  Fig. 25
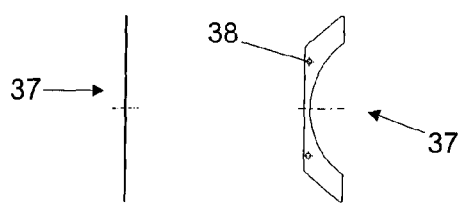
Fig. 26  Fig. 27  Fig. 28  Fig. 29
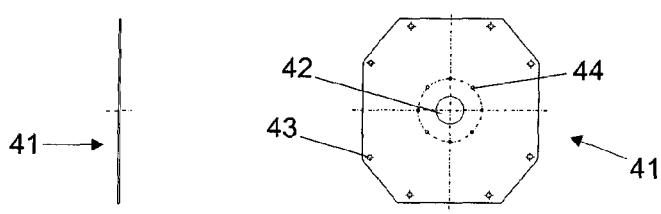
Fig. 30  Fig. 31

Section I-I

Section H-H

Section G-G

Section J-J

Detail ,,A,,

Detail ,,B,,

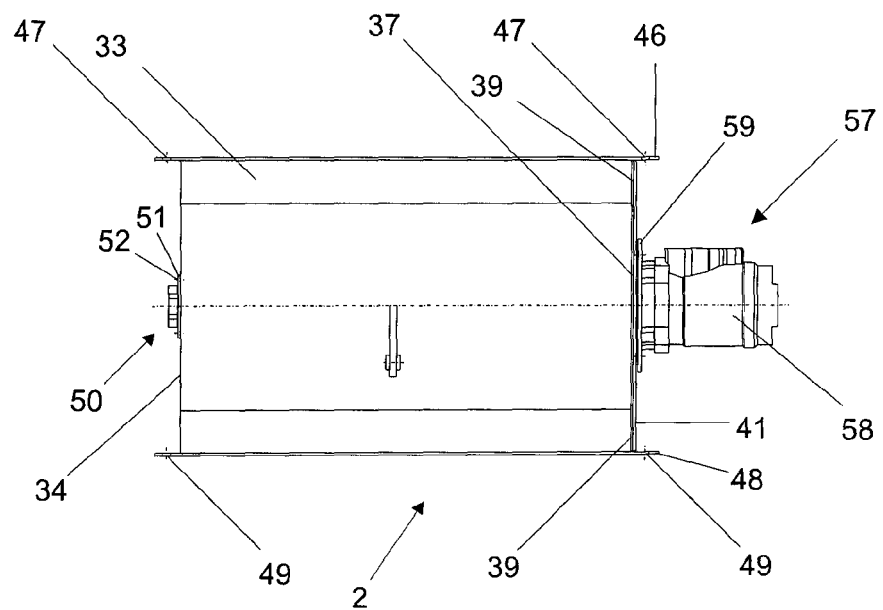
Fig. 47
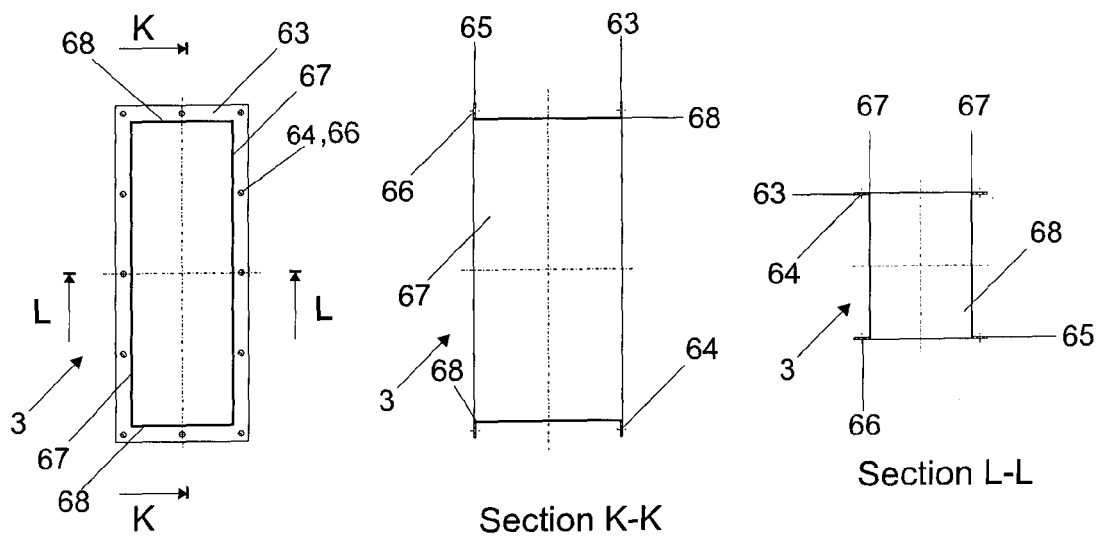
Fig. 48 | Section K-K Fig. 49 | Section L-L Fig. 50

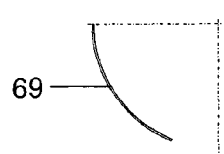
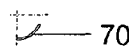
Fig. 51  Fig. 53  Fig. 55  Fig. 57
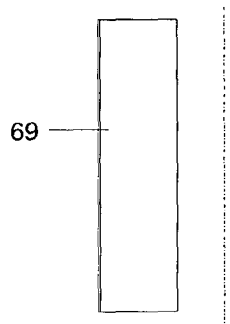
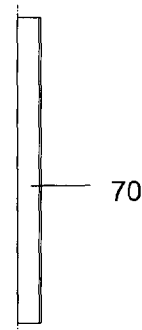
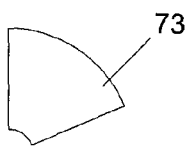
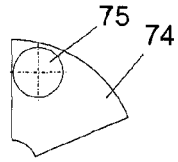
Fig. 52  Fig. 54  Fig. 56  Fig. 58
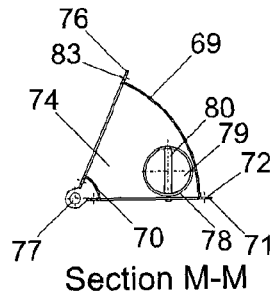
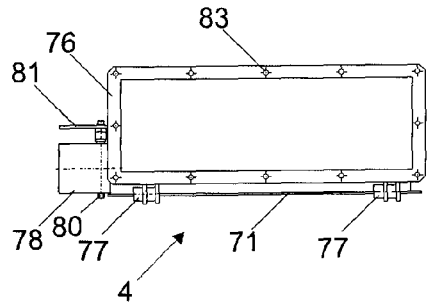
Section M-M
Fig. 61
Fig. 60
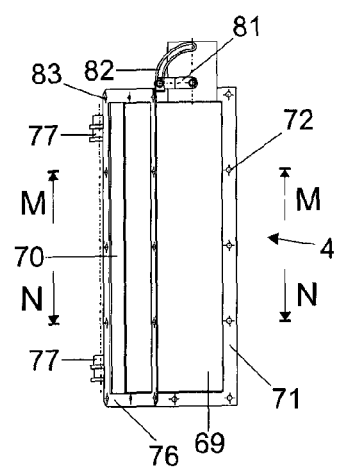
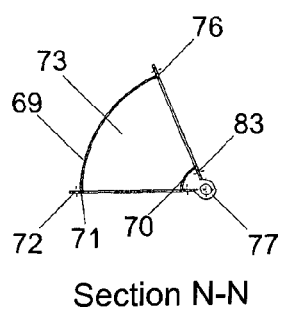
Fig. 59
Section N-N
Fig. 62

AIR BLAST SOFT FRUIT HARVESTING DEVICE

CROSS-REFERENCE TO RELATED APPLICATIONS

This application is a National Phase Application under 35 USC 371 of PCT/RS2013/000017, filed on Aug. 30, 2013 (published as WO 2014/035273), which claims priority to Serbian Application No. P-2012/0374, filed on Aug. 30, 2012. The disclosure of the prior application is considered part of and is incorporated by reference in its entirety in the disclosure of this application.

TECHNICAL FIELD OF THE INVENTION

The invention relates to the field of agriculture in general, and refers to an air blast soft fruit picking device.

According to the International Patent Classification (IPC), the invention may be classified as A01, which refers to agricultural machinery, and more specifically classified as A 01 D, referring to harvesting and mowing. Since the invention relates to soft fruit harvesting, the subclass symbol of the invention may be A 01 D 46/00, referring to picking of fruits, vegetables, hops, or the like, as well as to devices for shaking trees or shrubs. As the invention refers to harvesting with the use of air, the invention may also be more specifically classified as A 01 D 46/26, referring to devices for shaking trees or shrubs, as the most appropriate subclass of the patent classification system.

Since the invention refers to harvesting pneumatically, the invention may also be classified as A01D46/10, referring to harvesting of hops, tea, coffee or cotton pneumatically.

TECHNICAL PROBLEM

The technical problem resolved by the pertinent invention relates to the constructional solution of the air blast soft fruit (above all raspberries, but other cultures of shrubberies as well, such as blackberries, blueberries, and blackcurrants) harvesting device, for harvesting ripe fruits, with enabled regulation of the air flow directed at a fruit shrub, alternate air direction towards the bottom and top shrub area, and gradual change in speed and air blow power, using a blower fan, segmented extension (rotating crank), distancing channel, pulsator and air flow director.

BACKGROUND ART

It is common knowledge that harvesting of soft fruit such as strawberries, blackberries, blueberries and blackcurrants, has so far been generally performed manually, which was and still is extremely hard work and involving a large number of workers. Since the pertinent fruit grows on thorn bushes and is, nowadays, grown on large plantations, the harvesting problem is larger in terms of both speed and hygiene, as it is necessary to meet the requirements of the International Food Standard (HACCP standard).

There are a number of documents found amongst the national patent documents concerning the harvesting of fruit.

There is a device for pome fruit harvesting, registered as a national patent under number 50064, which contains a bar with fruit catcher mechanism at the front end, and at the back end, there is an arm for opening/closing the fruit catcher mechanism using a rope. The device is easy to use in terms of its mass and the elements comprising it are very simple. In fact, the device is manually operated which means it is not for harvesting large quantities of fruit in a short period of time.

The nationally registered patent issued under number 44477 describes a mechanism for shaking trees with a hydraulic device for a fruit-picking combine harvester. The device comprises a vibrator on the shaking head support with hydraulics, vibrating grate racks and fork lift with a platform for crate filling. The tree clamp is adjusted with a hydraulic cylinder.

A briar picking device with a pass-brush for closing the entry part is described in the national patent application issued under number P-471/99. The device contains a head with briar keeping rail attached to the bottom end, and teeth forming arc expansions and diminutions, with a blade positioned opposite the expansions. The brush is used for passing briars in a single direction inside the head body.

The national patent application issued under number P-223/04 describes a device for harvesting drupes (cherries, plums . . . ) by shaking trees and is made as a stand-alone connecting set attached to a tractor. The device contains a clamp throat mechanism enabling fruit catching after which shaking is performed, and the fruits fall into the collecting umbrella made of tarpaulin from which they fall onto a conveyor and, meeting the air flow created by a fan, they are transported to packages (crates).

The nationally registered patent under number 47636 describes a fruit-harvesting device designed exclusively for harvesting by shaking trees, collecting, treating and filling packages and distribution to the ground. The structure includes a mechanical arm with bars, rack with a conveyor from which the fruits are directed towards the additional transporter. The harvesting device is attached to a tractor.

A solution describing a fruit shaker and collector is presented in the national patent registered under number 47590, containing a transporter with mechanical arms over a telescopic tube and a head used for shaking with hydraulic cylinders.

The nationally registered patent under number 47246 describes a fruit combine harvester used primarily for shaking, collecting and treating fruits, which is positioned on a tractor with a incorporated water pump, nozzle fan and crate holder.

The national document issued under number P-16/96 describes a fruit-harvesting mechanical arm including a head positioned on a long bar. A holder is used for lifting a branch, and by simultaneous pulling of the cable, the case slides downwards holding a toothed comb which separates the fruit that falls into a bag. By loosening the cable, the spring restores the bag with comb to the starting position and the action can be repeated.

The nationally registered small patent number 314 MP presents a device for harvesting strawberries and clearing grass in strawberry patches, where the device itself has a frame with wheels on a rail, with a crate-holding basket on top of the frame and an operator seat in the middle. As the frame moves along the rail, the operator also moves and picks strawberries and puts them into crates.

The nationally registered small patent number 65 MP describes package carrier for manual fruit harvesting with manually picked fruits stored in packages.

The nationally registered small patent number 488 MP describes the invention relating to an attachment for harvesting soft fruit, above all raspberries and blackberries on plantations. The attachment is positioned on a carriage and is powered by a tractor or cultivator. The invention has an induction and thrust hood, feeding box with attached fan powered by a power unit. Underneath the feeding box, there is an incorporated flap with counterweight that opens up according to the set weight of the fruits that enter the crates. The solution of the invention refers to air flow around the branches containing fruits, transporting the picked fruits under pressure to the feeding box, whereas torn leaves and broken branches leaves the channel and fan through a special opening on the thrust hood.

National patent application number P-651/04 presents a device for the direct collection of fruits when falling from trees, including grid sheathing as a truncated cone or pyramid. The grid sheathing is tight so the fruits falling inside freely enter the containers positioned around the tree. The purpose of the invention is collecting the ripe fruits that fall freely from the tree or by manual/mechanical shaking.

Amongst patent documentation there is a solution described within the national patent issued under number 50064, named 'Pome Fruit Harvesting Device', which contains a bar with fruit catcher mechanism at the front end, and at the back end, there is an arm for opening/closing the fruit catcher mechanism using a rope. The device is easy to use in terms of its mass (approximately 0.6 kg) and the simplicity of the elements comprising it. The device is manually operated which makes it unsuitable for harvesting large quantities at high speed.

The document marked as WO2000/033637 (PCT/TR1999/000054) describes a solution of a pneumatic harvesting machine for different crops. The unit is primarily used for harvesting of cotton, olives and roses. The unit provided with a cyclone is equally used for harvesting almonds, walnuts, and beans. Fruits collected in closed or open areas are cleared from dust, soil and rubbish. The pneumatic machine is envisaged for harvesting and collecting grains from both trees and the ground, clearing them from the dust, soil and rubbish, simultaneously selecting the fruits according to their size. The machine comprises a box with the chassis and mounted hydraulic arms, pulley and V-belt, chain redactor, blower fans, filters, valves, tubes and cyclones, whereas the box is attached to a tractor as the power unit.

The solution described in the document marked as WO2000/062594 (PCT/AU2000/000322) presents the method of a pneumatic collection apparatus, with multiple collection ducts and vacuum system. The ducts are positioned so their open ends are close to a tree or shrub from which fruits are harvested under the influence of vacuum. The outer ends of the ducts may be flared or of different forms in order to facilitate harvesting. The ducts may be rigid, semi-rigid or flexible. The inner ends of the ducts are connected to the harvested fruit collecting box.

Harvesting presents a special problem on sloped areas, hence the solution described in the document WO1996/032833 (PCT/US1995/005050), presenting processing using of water. The land is sloped on both sides with multiple levels and ducts containing water between those levels. Water flows under pressure onto the plants and fruits thus separating the fruits from the plants. Fruits fall into water and are collected from it using boats and conveyors or water elevators, which are provided with tubes for collecting food products from the water.

The document issued as U.S. Pat. No. 3,881,226 presents a mechanism for harvesting, cleaning and discharging mainly cotton, and it is supplied by a conduit extended to the fruit collecting chamber. The mechanism includes an air blower through which the air flows picks up the cotton bolls and moves them towards the conduit, a series of specially shaped rotors, as well as cross chambers and discharge means. Cotton bolls on the discharge means move towards another air channel, separating solid materials, twigs and other rubbish accumulated with the cotton.

Cotton harvester described in the document U.S. Pat. No. 3,813,857 presents a pneumatic apparatus with a pump creating pressure and vacuum. The device elements are provided with panels so the cotton is supplied to and from the pump using pressure and vacuum. A modified tractor is used power unit with two large driven wheels and one steerable wheel.

The document U.S. Pat. No. 4,637,096 describes a method and apparatus for cleaning cotton and the like, with an air stream created in a chamber and filter. Vibrators separate dirt from the collected products.

There is also an apparatus and system for collecting and cleaning lint, cotton or similar products described in the document U.S. Pat. No. 4,294,597. The device is suitable for a textile mill, the lumber industry and other air contaminating industrial processes. The device is provided with a drum filter and particle collecting device and chamber with the said filter on top, all within a bin structure.

The American patent document U.S. Pat. No. 5,319,911 describes a nut harvester for harvesting products from plantations. The harvester uses compressed air passing through Venturi tubes, creating a vacuum inside the channel, thus sucking nuts into it.

There is also a solution for a mechanical fruit picker described in the American patent document U.S. Pat. No. 4,558,561 where the picker includes a vacuum-operating tube mounted to a tractor. The vacuum is created by a fan blower mounted to the tractor.

The American patent document U.S. Pat. No. 4,388,798 presents a vacuum operated machine for harvesting fruit from trees, comprising a picker head connected to an air blower which is connected to an airflow control valve. The machine has a discharge valve connected to the airflow control valve by means of multiple rigid or flexible channels that are rounded or cylindrical. The picker head comprises inlet and outlet channels or tubes, sloped on the side of inlet channels between the inlets. The vacuum pump as the source is connected to the support and engine by a belt. The entire conveyance is mobile and provided with support securing the engine connected to the transmission that operates the wheels.

There are a number of vacuum operated pickers for harvesting fruits from trees, and one such type with sections of rigid and flexible tubes and channels is presented in U.S. Pat. Nos. 2,545,072; 3,473,312 and 3,664,104. The advantage of such machines is, above all, the possibility to pick very large quantities of fruit from trees.

The majority of the said solutions are created for shaking the fruit trees, which additionally harms the fruit itself, and so they are less and less used in practice. Some of the solutions are based on improvements in manual harvesting of fruit which is extremely slow, hard and expensive.

Following this field of agriculture, especially soft fruit harvesting, the inventor has found a new solution to the picker, which will be thoroughly described herein.

DISCLOSURE OF THE INVENTION

The invention relates to the air blast soft fruit harvesting device comprising an air flow director, pulsator, distancing channel, segmented extension and blower fan.

The distancing channel is connected to the pulsator on the bottom side and to the segmented extension on the top side. Simultaneously, the pulsator is connected to the air flow director on the bottom side, whereas the segmented extension is connected to the blower fan on the top side.

The connection between the distancing channel and segmented extension and pulsator, as well as connection between the pulsator and the air flow director, is executed with bolts through cylindrical openings on flanges, whereas the connection between the segmented extension and blower fan is executed with a hinge.

Thus the structured device for harvesting soft fruit using the air blast is provided with an independent pulsator and blower fan units with special hydraulic motors.

The blower fan constantly sends air to the air flow director, which directs it towards a fruit shrub, thus shaking ripe fruits. In the course of rotor operation, the pulsator alternately sends air, in a single cycle, between the lateral sides of each box respectively and through both halves of the director channel, respectively. The section allowing air flow through the pulsator rotor is variable due to the rotating of the pulsator rotor, and so is the air flow speed, which is how its power effect is finally obtained.

When using the device for harvesting soft fruit, two devices are used simultaneously, positioned one opposite the other with a row of shrubs between them.

By changing the distancing channel, the air flow director height is adjusted, determining the height of the shrubs in a row.

Air quantity produced by the blower fan is invariable, which is why all or only a part of it is sent towards the air flow director by emitting a part of it into the atmosphere through a connecting tube by manual turning of a throttle around the pivot using a lever moving in a slot link.

Thus, it is possible to regulate the air blast power and speed, which was the prime intention of the device and the inventor succeeded.

BRIEF DESCRIPTION OF THE DRAWINGS

The invention is thoroughly described in the execution example in the drawing wherein:

FIG. 5 represents the side view of the pulsator rotor swivel pipe
FIG. 6 represents the front view of the pulsator rotor swivel pipe
FIG. 7 represents FIG. 5 section A-A
FIG. 8 represents FIG. 7 section B-B
FIG. 9 represents the side view of the partition box
FIG. 10 represents the front view of the partition box
FIG. 11 represents the top view of the partition box
FIG. 12 represents the top view of the partition
FIG. 13 represents the side view of the partition
FIG. 14 represents the side view of the pulsator rotor left hub
FIG. 15 represents FIG. 14 section C-C
FIG. 16 represents the side view of the pulsator rotor right hub
FIG. 17 represents FIG. 16 section D-D
FIG. 18 represents the side view of the pulsator rotor
FIG. 19 represents the top view of the pulsator rotor
FIG. 20 represents FIG. 18 section E-E
FIG. 21 represents FIG. 20 section F-F
FIG. 22 represents the front view of the pulsator case side metal sheet
FIG. 23 represents the side view of the pulsator case side metal sheet
FIG. 24 represents the front view of the pulsator case front metal sheet
FIG. 25 represents the side view of the pulsator case front metal sheet
FIG. 26 represents the front view of the pulsator case front metal sheet
FIG. 27 represents the side view of the pulsator case front metal sheet
FIG. 28 represents the front view of the pulsator case front metal sheet
FIG. 29 represents the side view of the pulsator case front metal sheet
FIG. 30 represents the front view of the hydraulic motor flange
FIG. 31 represents the side view of the hydraulic motor flange
FIG. 47 represents the front view of the pulsator
FIG. 48 represents the top view of the distancing channel
FIG. 49 represents FIG. 48 section K-K
FIG. 50 represents FIG. 48 section L-L
FIG. 51 represents the side view of the segmented extension (crank) external metal sheet
FIG. 52 represents the top view of the segmented extension (crank) external metal sheet
FIG. 53 represents the side view of the segmented extension (crank) internal metal sheet
FIG. 54 represents the top view of the segmented extension (crank) internal metal sheet
FIG. 55 represents the front view of the segmented extension (crank) front right metal sheet
FIG. 56 represents the side view of the segmented extension (crank) front right metal sheet
FIG. 57 represents the front view of the segmented extension (crank) front left metal sheet with cylindrical opening
FIG. 58 represents the side view of the segmented extension (crank) front left metal sheet with cylindrical opening
FIG. 59 represents the top view of the segmented extension (crank)
FIG. 60 represents the front view of the segmented extension (crank)
FIG. 61 represents FIG. 59 section M-M
FIG. 62 represents FIG. 59 section N-N

DETAILED DESCRIPTION OF THE INVENTION

Figure 1:
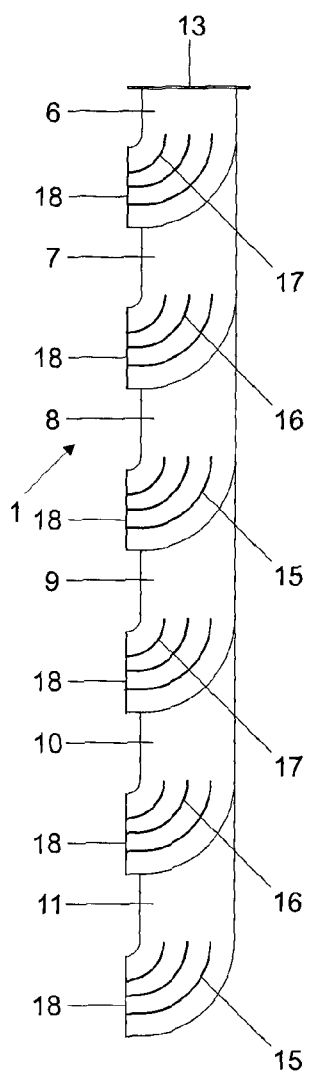
FIG. 1 represents the right side view of the air flow director
Figure 2:
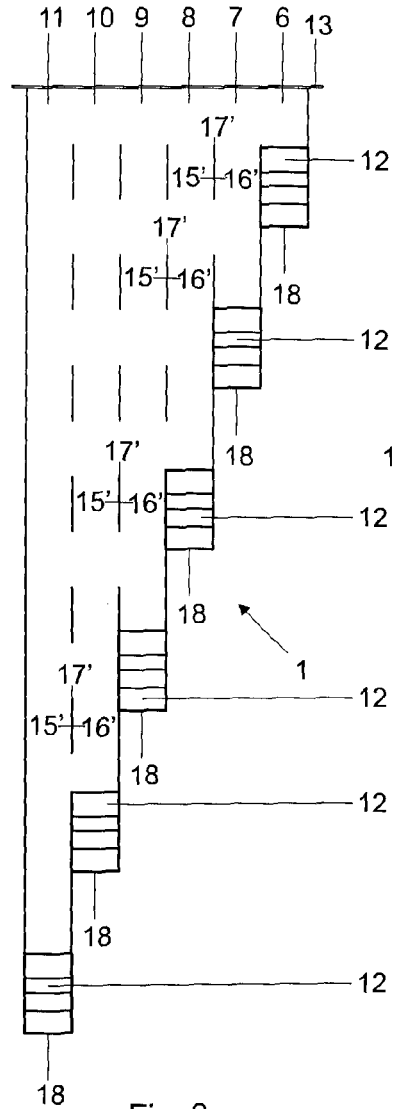
FIG. 2 represents the front view of the air flow director
Figure 3:
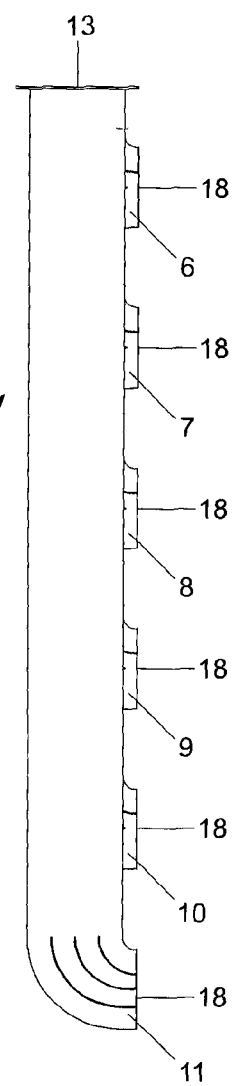
FIG. 3 represents the left side view of the air flow director
Figure 4:
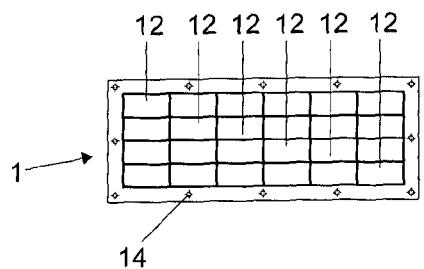
FIG. 4 represents the top view of the air director
Figure 32:
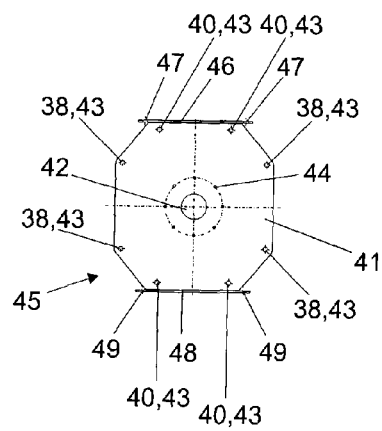
FIG. 32 represents the side view of the pulsator case
Figure 34:
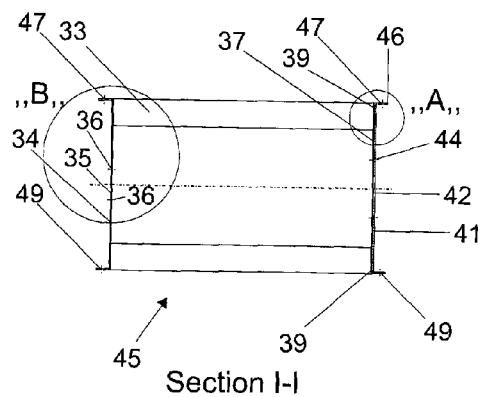
FIG. 34 represents FIG. 33 section I-I
Figure 33:
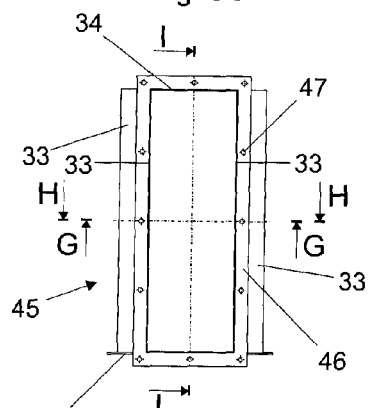
FIG. 33 represents the top view of the pulsator case
Figure 35:
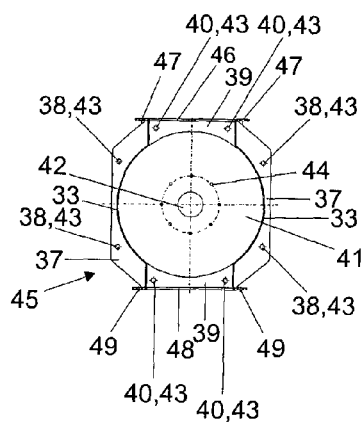
FIG. 35 represents FIG. 33 section H-H
Figure 36:
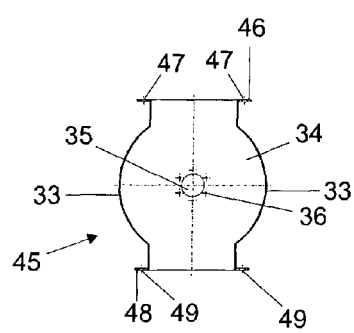
FIG. 36 represents FIG. 33 section G-G
Figure 37:
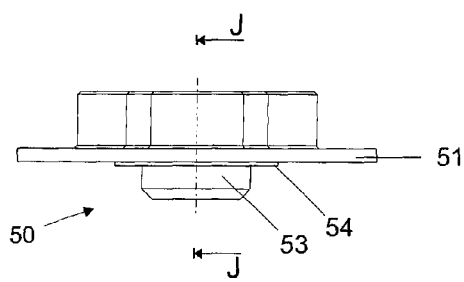
FIG. 37 represents the front view of the pulsator flange assembly
Figure 38:
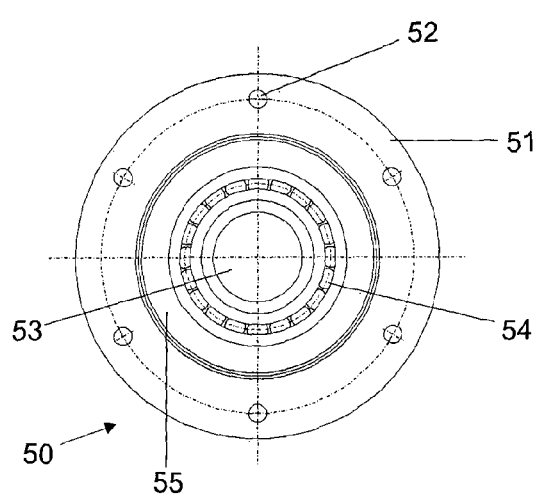
FIG. 38 represents the internal side view of the pulsator flange assembly
Figure 39:
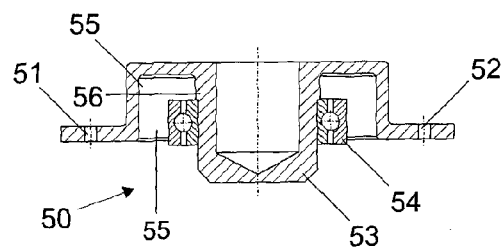
FIG. 39 represents FIG. 37 section J-J
Figure 40:
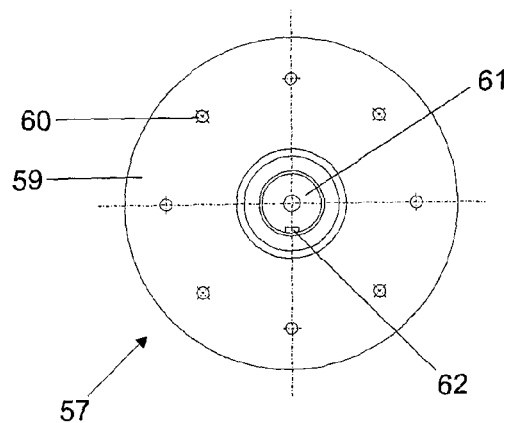
FIG. 40 represents the internal side view of the pulsator suspension and drive unit assembly
Figure 41:
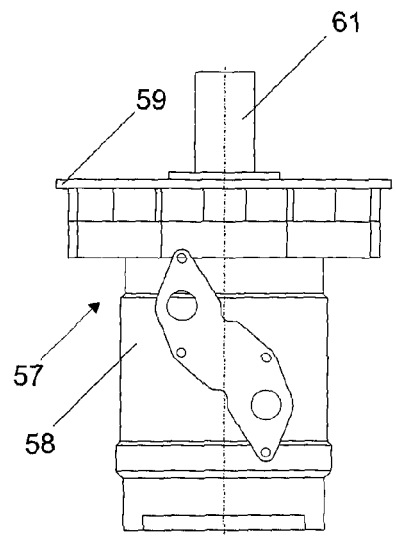
FIG. 41 represents the top view of the pulsator suspension and drive unit assembly
Figure 42:
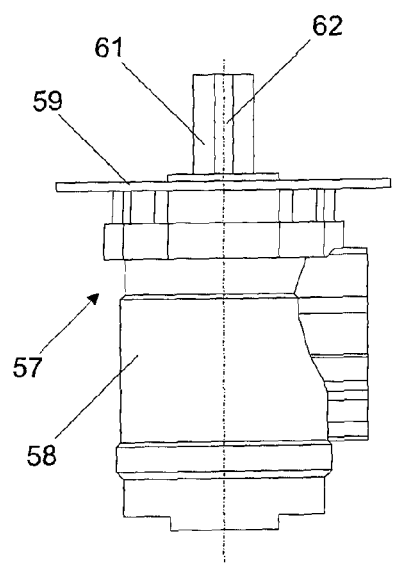
FIG. 42 represents the front view of the pulsator suspension assembly
Figure 43:
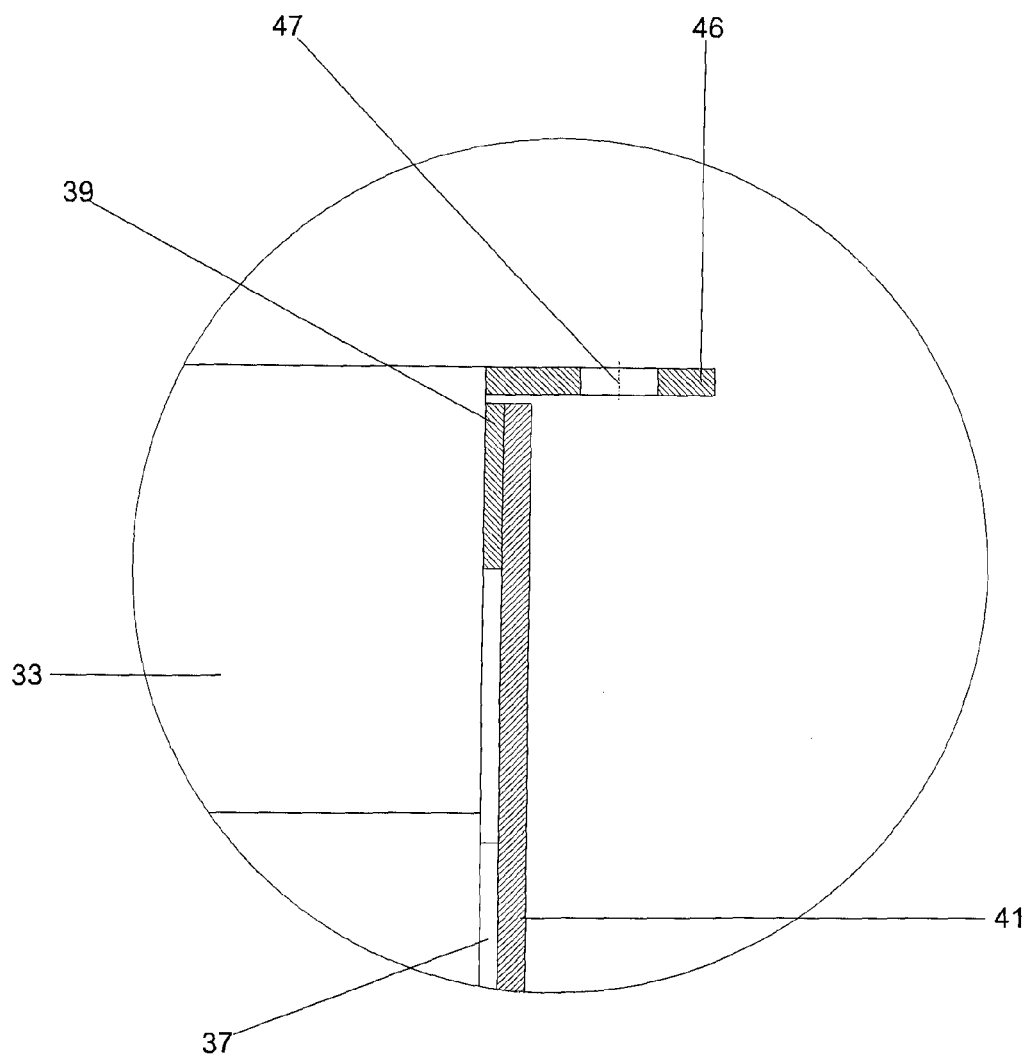
FIG. 43 represents FIG. 34 detail 'A' in larger scale
Figure 44:
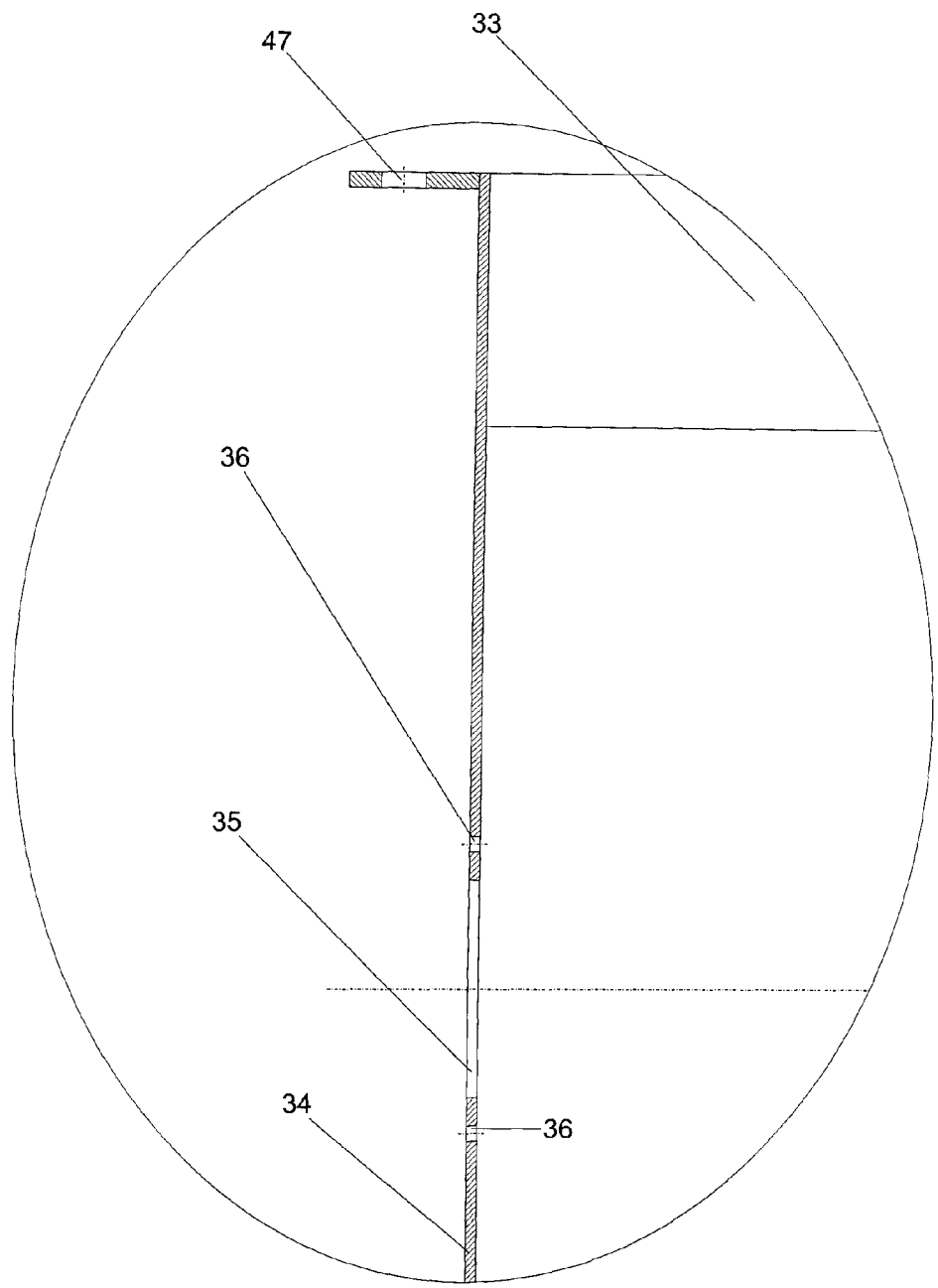
FIG. 44 represents FIG. 34 detail 'B' in larger scale
Figure 45:
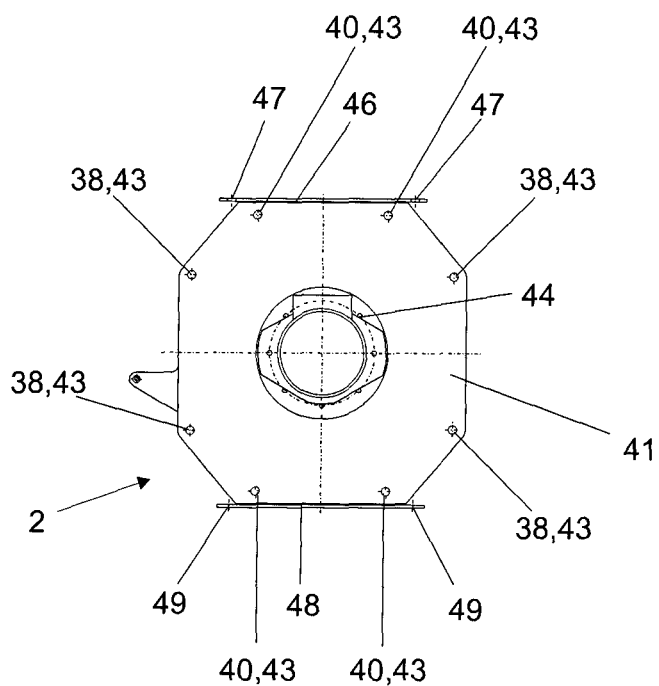
FIG. 45 represents the right side view of the pulsator
Figure 46:
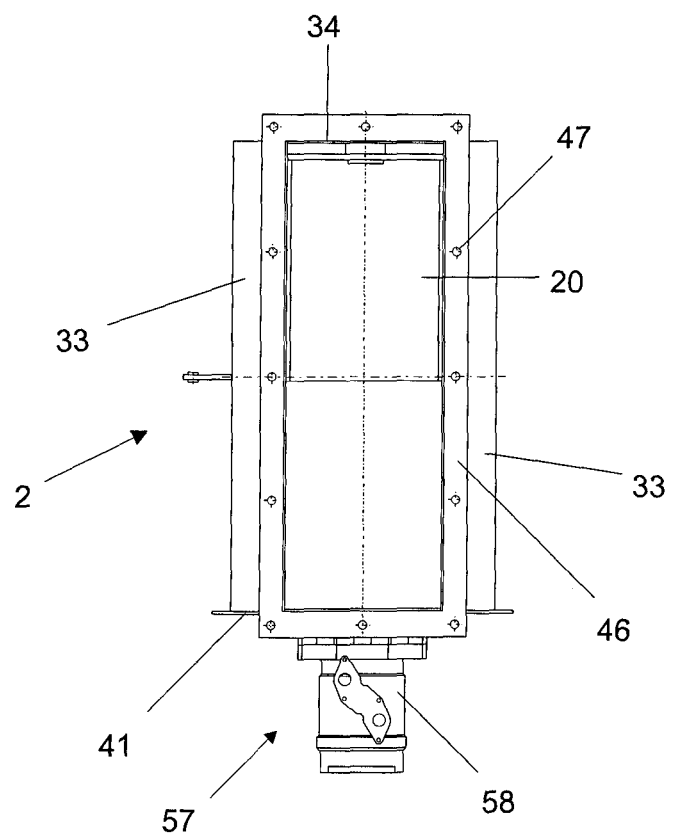
FIG. 46 represents the top view of the pulsator
Figure 63:
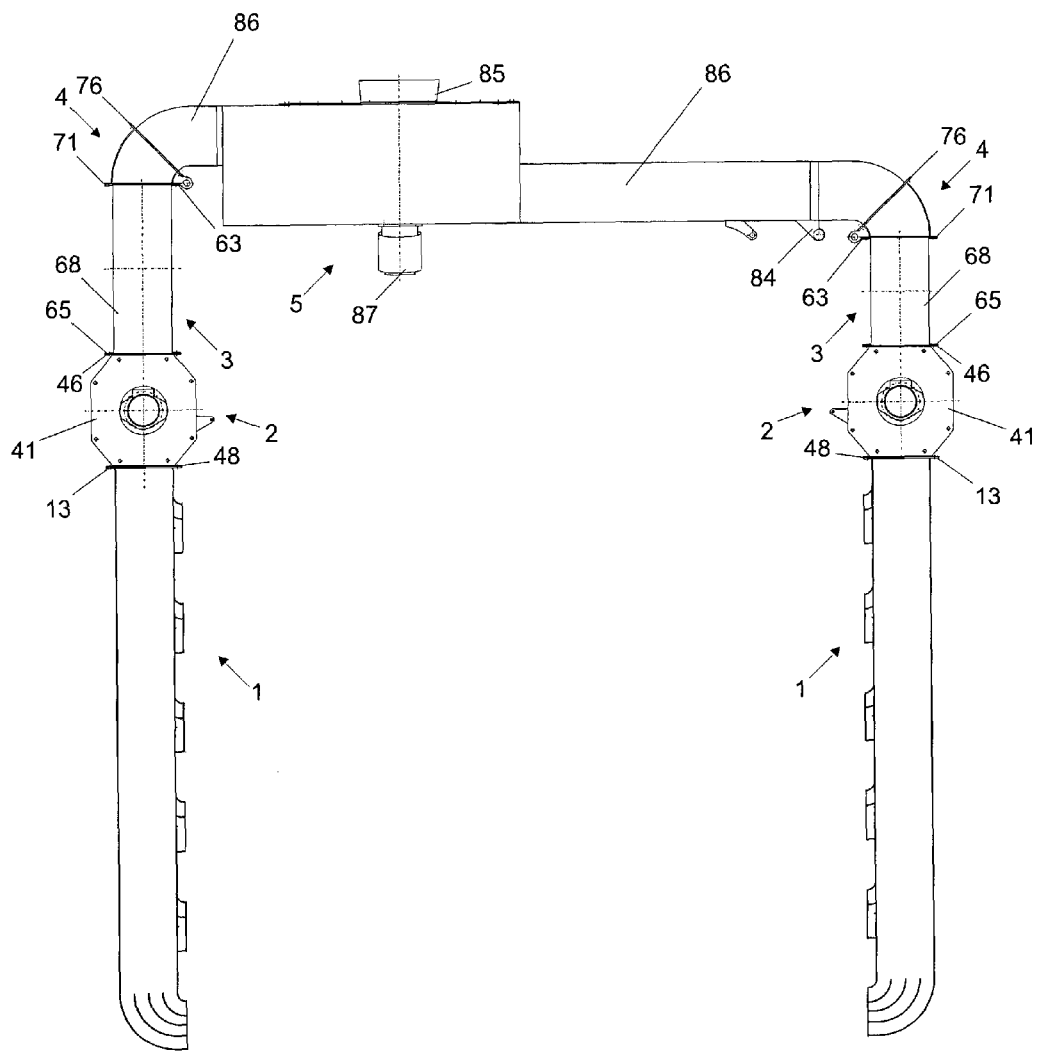
FIG. 63 represents the front view of the invention device assembly
Figure 64:
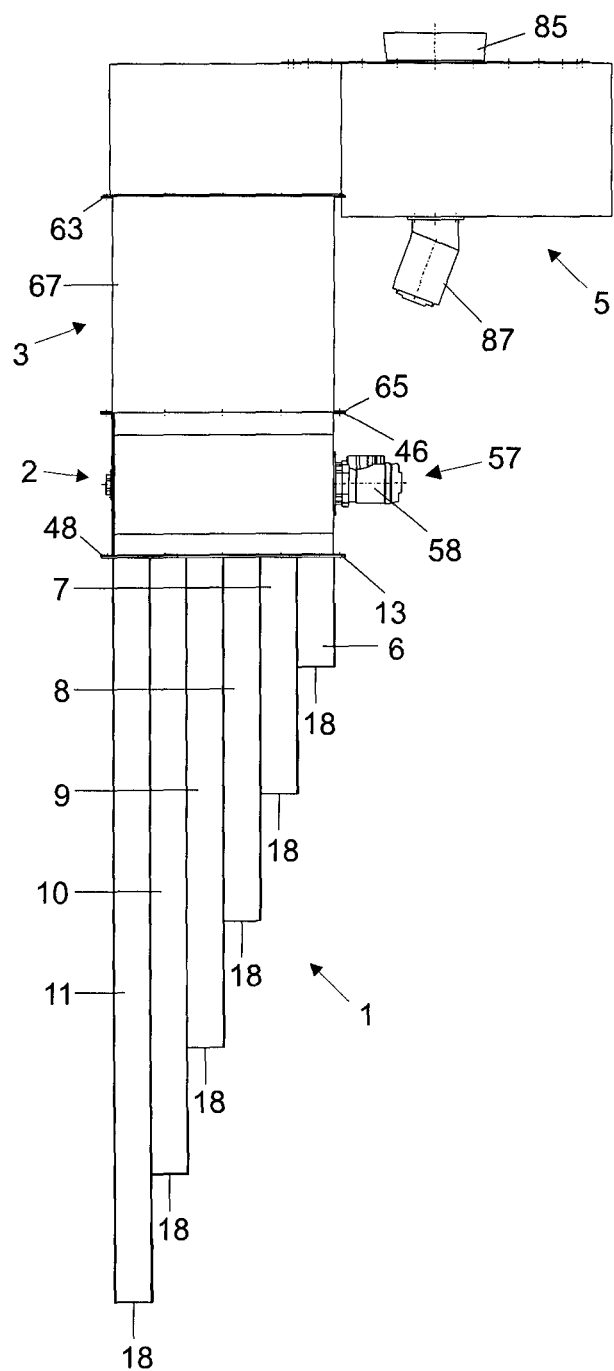
FIG. 64 represents the left side view of the invention device assembly
Figure 65:
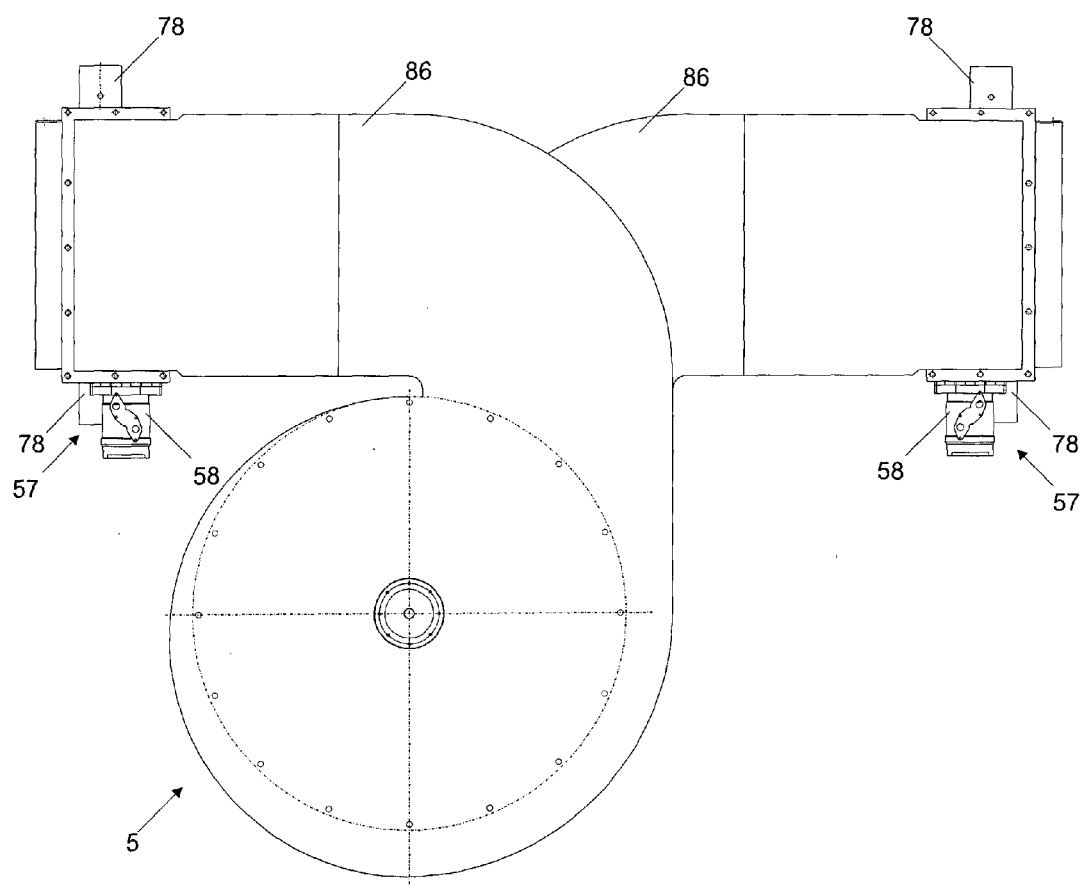
FIG. 65 represents the top view of the invention device assembly

The invention relates to the air blast soft fruit harvesting device comprising an air flow director 1, pulsator 2, distancing channel 3, segmented extension 4 and blower fan 5.

The director 1 comprises channels 6, 7, 8, 9, 10 and 11, that differ only in total length, and each of them is separated with internal plates (not numbered in the drawings) into four channels each 12. All of the channels 6, 7, 8, 9, 10 and 11 are positioned on the top side, for the flange 13 thickness retracted in the flange 13 and welded with the flange 13, upon which the cylindrical openings 14 are made. On the external plates of the channels 6, 7, 8, 9, 10 and 11, there are arc openings 15, 16 and 17, and on the internal ones there are grooves 15' and 16', in which the internal partition plates (not indicated and numbered in the drawings) are mounted with the bulges 17' and forming the channels 12. All the channels 12 at each of the channels 6, 7, 8, 9, 10 and 11, are rimmed at the outlets with a ring 18.

The entire director 1 assembly is formed by welding.

The pulsator 2 comprises the rotor 32 positioned inside the case 45.

The rotor 32 comprises the swivel pipe 19, two boxes 22, partition 31, hub 26 and hub 29.

In the swivel pipe 19 wall there are two opposite rectangular openings 20 and two opposite rectangular openings 21, where the openings 20 and 21 are intersected abeam.

The box 22 consists of two lateral sides 23 and the external wall 24 in the middle of which there is a cylindrical opening 25. The connection between the lateral sides 23 and the external wall 24 is joined by welding.

In the middle of the swivel pipe 19 there is the partition 31, and on each side of the swivel pipe 19 there is the box 22, matching the clearance between lateral sides 23 of one box 22 with the openings 20, and of the other box 22 with the openings 21.

The swivel pipe 19, partition 31 and boxes 22 formed in this way present the entire set and rigid assembly.

The hub 26 has cylindrical recess 27 and cylindrical opening 28, and the hub 29 has cylindrical opening 30 and wedge (not indicated in the drawings) groove (not indicated in the drawings).

In cylindrical openings 25, on the external walls 24 of the box 22, on one side there is the hub 26, and on the other there is the hub 29, both welded to the corresponding front wall 24 of the box 22.

In the cylindrical recess 27 of the hub 26, there is a ball bearing 54, and the sleeve 53, upon which the ball bearing 54 is mounted, partly enters the cylindrical opening 28.

The sleeve 61 of the hydraulic motor 58 rotor 32 suspension and drive unit assembly 57 is positioned inside the cylindrical opening 30 in the hub 29 and over the wedge groove 62 on the sleeve the hub 29 is keyed, as well as the rotor 32.

The pulsator 2 case 45 comprises two lateral metal sheets 33, front metal sheet 34, two front metal sheets 37, two front metal sheets 39, hydraulic motor 58 flange 41, top flange 46 and bottom flange 48.

The front metal sheet 34 has cylindrical opening 35 and six cylindrical openings 36.

Each front metal sheet 37 has two cylindrical openings 38, as well as each front metal sheet 39 with two cylindrical openings 40.

The hydraulic motor 58 flange 41 has cylindrical opening 42, eight cylindrical openings 43 and eight cylindrical openings 44.

On the top flange 46 edges, there are twelve cylindrical openings 47, and on the bottom flange 48 edges, there are twelve cylindrical openings 49, where on the flanges 46 and 48 there are intermediate rectangular openings (not indicated in the drawings).

Between the top flange 46 and bottom flange 48 there are lateral metal sheets 33, partly retracted in the flanges 46 and 48 by the thickness of the flanges 46 and 48.

On one side, between the lateral metal sheets 33, there is the front metal sheet 34, closing the front side of the case 45 and partly retracted in the flanges 46 and 48 by the thickness of the flanges 46 and 48.

The other front side of the case 45 is closed with two front metal sheets 37 and 39 and the hydraulic motor 58 flange 41.

Two front metal sheets 37 are positioned one opposite the other, and two front metal sheets 39 between them are also positioned one opposite the other, thus forming a cylindrical clearance through which the rotor 32 runs freely, in the course of assembly.

The case 45 structure is joined by welding.

The hydraulic motor 58 flange 41 is connected with the front metal sheets 37 by four bolts (not indicated in the drawings) through cylindrical openings 38 and 43, and with the front metal sheets 39 also by four bolts (not indicated in the drawings) through cylindrical openings 40 and 43.

The hydraulic motor 58 flange 41 is connected with the rotor 32 suspension and drive unit assembly 57 flange 59 by bolts (not indicated in the drawings) in cylindrical openings 44 and 60.

The flange assembly 50 is made of flange 51 with six cylindrical openings 52, and in the middle of the internal section in the ring recess 55 there is a sleeve 53 with expansion 56. On the sleeve 53 there is a ball bearing 54 forming a rigid connection between the sleeve 53 and the internal ring of the bearing 54. The internal ring of the bearing 54 rests on the expansion 56. The flange assembly 50 is mounted on the hub 26 so the hub 26 is positioned in the ring recess 55, and the bearing 54 in the cylindrical opening 27 on the hub 26. The external ring of the ball bearing 54 in the cylindrical opening 27 rotates freely, since they form a loose connection. The flange 51 is connected with the front metal sheet 34 by bolts (not indicated in the drawings) in cylindrical openings 52 and 36.

In the formed case 45 assembly, with pulsator 2 flange assemblies 50 and 57 and rotor 32 positioned in the case 45, the rotor 32 is powered by the hydraulic motor 58 and freely rotates around its longitudinal axis, and on the other side it rests on the ball bearing 54.

The air flow director 1 is connected with the pulsator 2 by bolts (not indicated in the drawings) through cylindrical openings 14 on the director 1 flange 13 and cylindrical openings 49 on the pulsator 2 bottom flange 48.

The distancing channel 3 comprises the top flange 63, bottom flange 65, two lateral metal sheets 67 and two front metal sheets 68.

On the top flange 63 there are twelve cylindrical openings 64, and on the bottom flange 65 there are also twelve cylindrical openings 66.

Between the top flange 63 and bottom flange 65 there are side metal sheets 67, as well as front metal sheets 68, where the metal sheets 67 and 68 are partly retracted in the flanges 63 and 65 by the thickness of the flanges 63 and 65, forming the rectangular cross section distancing channel 3.

The distancing channel 3 is joined by welding.

With the use of channel 3 with various metal sheets 67 and 68 heights, the air flow director 1 height is adjusted in relation to the ground.

The pulsator 2 is connected with the distancing channel 3 by bolts (not indicated in the drawings) through cylindrical openings 47 on the pulsator 2 top flange 46 and cylindrical openings 66 on the distancing channel 3 bottom flange 65.

The segmented extension 4 is made as a crank, and comprises the external metal sheet 69, internal metal sheet 70, front metal sheets 73 and 74, flanges 71 and 76, connecting tube 78 with a throttle 79, pivot 80, lever 81 and slot link 82.

Flanges 71 and 76 close a certain angle between them. Between flanges 71 and 76, there are the external metal sheet 69 and the internal metal sheet 70, and on the lateral sides there are the front metal sheet 73 and the front metal sheet 74 upon which there is a cylindrical opening 75. The segmented expansion 4 structure is made by welding the metal sheets 69, 70, 73 and 74 to the flanges 71 and 76, and the metal sheets 69 and 70 with the metal sheets 73 and 74, forming the rectangular cross section channel for the air flow. For technological reasons, the flange 76 has cylindrical openings 83, which have no particular role in the device structure of the invention.

In the cylindrical opening 75 on the front metal sheet 74, there is also a welded connecting tube 78 with a throttle 79 attached to the pivot 80. On the pivot 80, outside the connecting tube 78, there is a lever that moves in the slot link 82.

The segmented extension 4 is connected on the bottom side with the distancing channel 3 by bolts (not indicated in the drawings) through cylindrical openings 72 on the segmented extension 4 flange 71 and cylindrical openings 64 on the distancing channel 3 top flange 63. Hinge assembly 77 is welded to the segmented extension 4.

The blower fan 5 rotor (not indicated in the drawings), powered by the hydraulic motor 87, sucks air through the inlet pipe 85, transports it through the outlet channel 86, through the segmented extension 4, distancing channel 3, pulsator 2 to the director 1. On the external side of the blower fan 5 outlet channel 86, the hinge 84 is welded to connect with the segmented extension 4.

The segmented extension 4 is connected by two hinge assemblies 77 with the blower fan 5 assembly, over two hinges 84, where the outlet channel 86 is partly retracted in the opening (not indicated in the drawings) on the flange 76 of the segmented extension 4.

All of the flanges 13, 46, 48, 63, 65, 71 and 76 are made in the form of a rectangular frame with intermediate openings (not indicated in the drawings).

The device for harvesting of soft fruit using the air blast structured this way is provided with independent pulsator 2 and blower fan 5 units with special hydraulic motors 58 and 87.

The blower fan 5 constantly sends air to the director 1, through the segmented extension 4, distancing channel 3, pulsator 2 rotor 32 and through the channels 6, 7, 8, 9, 10 and 11, as well as their channels 12, from where it is directed towards a fruit shrub, thus shaking ripe fruits.

Through the pulsator 2 rotor 32, in a single cycle, the air alternately runs between the lateral sides 23 of one box 22, then through the channels 6, 7 and 8 as well as their channels 12, and then between the lateral sides 23 of the other box 22 through the channels 9, 10 and 11, as well as their channels 12. That way, the air is directed alternately towards a shrub, first towards the upper area and then towards the lower area of the shrub. Due to the rotating of the pulsator 2 rotor 32, the cross section allowing air flow through the rotor 32 towards the director 1 is variable, and so is the air flow speed, thus obtaining its power effect.

Air quantity produced by the blower fan 5 is invariable, which is why all or only a part of it is sent towards the air flow director 1, by emitting a part of it into atmosphere through connecting tube 78. On the pivot 80 there is a throttle 79 positioned in the connecting tube 78, where on the pivot 80, on the external side of the connecting tube 78, there is a lever 81 which moves in the slot link 82, so with manual turning of the lever 81, the throttle 79 moves as well, regulating size of the cross section in the connecting tube 78 through which part of the air is emitted into the atmosphere. Thus, regulation of the speed and air blow power impact on a fruit shrub is obtained.

When using this device for harvesting soft fruit, two devices are used on a special frame (not indicated in the drawings) with a row of shrubs between them.

By changing the distancing channel, the air flow director height is adjusted, determining height of the shrubs in a row.

It is also possible to regulate the air blast power and speed by changing the number of cycles of the power unit, which was the prime intention of the entire device structure and the inventor succeeded.

The invention device power unit uses a tractor with an attached frame holding the device, and a self-powered unit may also be executed.

The invention device is made by welding according to the ISO 5817 standard with prior preparation of seams according to the ISO 3042 standard and parts according to the SRPS M.E2.162 standard.

Balancing of the rotating elements is in class G 6.3 according to the ISO 1940 (1973) standard.

The invention claimed is:

1. A soft fruit picking device, comprising:
   a fan comprising a motor, an inlet pipe configured to take in outside air, and an outlet channel to transport air away from the fan,
   a pulsator in connection with the outlet channel configured to receive air from the channel, the pulsator comprising a second motor and a rotor, wherein the rotor comprises a swivel pipe wherein the longitudinal axis of the pipe is oriented perpendicular to the direction of airflow entering the pulsator, the swivel pipe having i) a first pair of parallel openings, ii) a second pair of parallel openings located at a longitudinal distance from the first pair, and iii) a partition at a point along the longitudinal axis of the swivel pipe; and,
   a director channel configured to receive air from the pulsator comprising at least a first and second sub-channel through which the air flows, the first sub-channel being physically separated from the second sub-channel, wherein the first and second sub-channels each have at least one opening, the first sub-channel opening being positioned higher relative to the second sub-channel opening,
   wherein the air received by the pulsator is directed through the rotor such that the air is discharged out of one or both of the first sub-channel opening and the second sub-channel opening.

2. The soft fruit picking device of claim 1, wherein the air is discharged alternately out of the first sub-channel opening and the second sub-channel opening in a single cycle of the rotor.

3. The soft fruit picking device of claim 1, further comprising a throttle coupled to the outlet channel which allows regulation of the amount of air delivered to the pulsator.

4. The soft fruit picking device of claim 1, wherein the director channel has an adjustable height.

5. The soft fruit picking device of claim 1, wherein the first sub-channel has at least a second opening and the second sub-channel has at least a second opening along the length of the director channel.

\* \* \* \* \*